(12) United States Patent
Cole et al.

(10) Patent No.: US 8,497,684 B2
(45) Date of Patent: Jul. 30, 2013

(54) DIPOLE LOCATOR USING MULTIPLE MEASUREMENT POINTS

(75) Inventors: Scott B. Cole, Edmond, OK (US);
Michael F. Gard, Perry, OK (US);
David R. Brown, Perry, OK (US);
Bradley S. Marshall, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 2 days.

(21) Appl. No.: 12/844,886

(22) Filed: Jul. 28, 2010

(65) Prior Publication Data

US 2010/0289496 A1 Nov. 18, 2010

Related U.S. Application Data

(63) Continuation of application No. 11/382,644, filed on May 10, 2006, now Pat. No. 7,786,731.

(60) Provisional application No. 60/728,066, filed on Oct. 19, 2005, provisional application No. 60/680,780, filed on May 13, 2005.

(51) Int. Cl.
*G01V 3/08* (2006.01)

(52) U.S. Cl.
USPC .......................................... 324/326

(58) Field of Classification Search
USPC .................. 324/326–327, 338–339
See application file for complete search history.

(56) References Cited

U.S. PATENT DOCUMENTS

| | | | |
|---|---|---|---|
| 4,542,344 A * | 9/1985 | Darilek et al. | 324/326 |
| 4,742,356 A | 5/1988 | Kuipers | |
| 5,699,048 A | 12/1997 | Galloway | |
| 6,005,532 A | 12/1999 | Ng | |
| 6,035,951 A | 3/2000 | Mercer et al. | |
| 6,563,474 B2 | 5/2003 | Nantz et al. | |
| 6,737,867 B2 * | 5/2004 | Brune et al. | 324/326 |
| 6,865,455 B1 * | 3/2005 | Wiegert | 701/23 |
| 6,882,154 B2 | 4/2005 | Mercer et al. | |
| 6,924,767 B2 | 8/2005 | Kitahara et al. | |
| 7,009,399 B2 | 3/2006 | Olsson et al. | |
| 7,013,990 B1 * | 3/2006 | Nickel et al. | 175/45 |
| 7,042,411 B2 | 5/2006 | Yagi et al. | |
| 7,952,357 B2 * | 5/2011 | Cole | 324/326 |

FOREIGN PATENT DOCUMENTS

| | | |
|---|---|---|
| DE | 19533105 A1 | 10/1996 |
| EP | 1526606 A1 | 4/2005 |
| JP | 2003249816 A1 | 9/2003 |
| WO | 9530913 | 11/1995 |
| WO | 0010456 | 3/2000 |

* cited by examiner

*Primary Examiner* — Reena Aurora

(74) *Attorney, Agent, or Firm* — Tomlinson Rust McKinstry Grable

(57) ABSTRACT

A receiver and tracking system for identifying a location of a magnetic field source. In a preferred embodiment a plurality of tri-axial antennas are positioned at three distinct points on a receiver frame. Each antenna detects a magnetic field from a source and a processor is used to determine a location of the source relative to the frame using the antenna signals. Each tri-axial antenna comprises three windings in each of three channels defined by a support structure. The windings each define an aperture area. The windings have substantially identical aperture areas and have a common center point. The receiver may to display to the operator the relative location of the field source or may direct the operator to a spot directly above the field source.

9 Claims, 8 Drawing Sheets

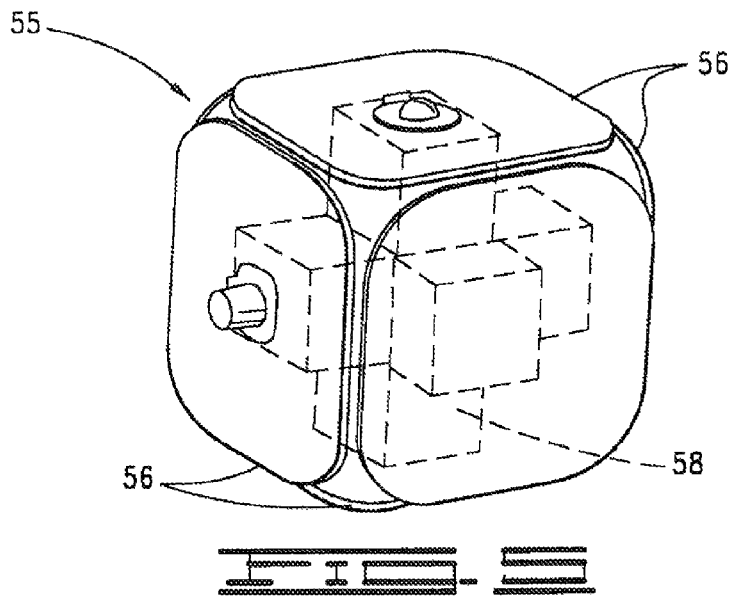
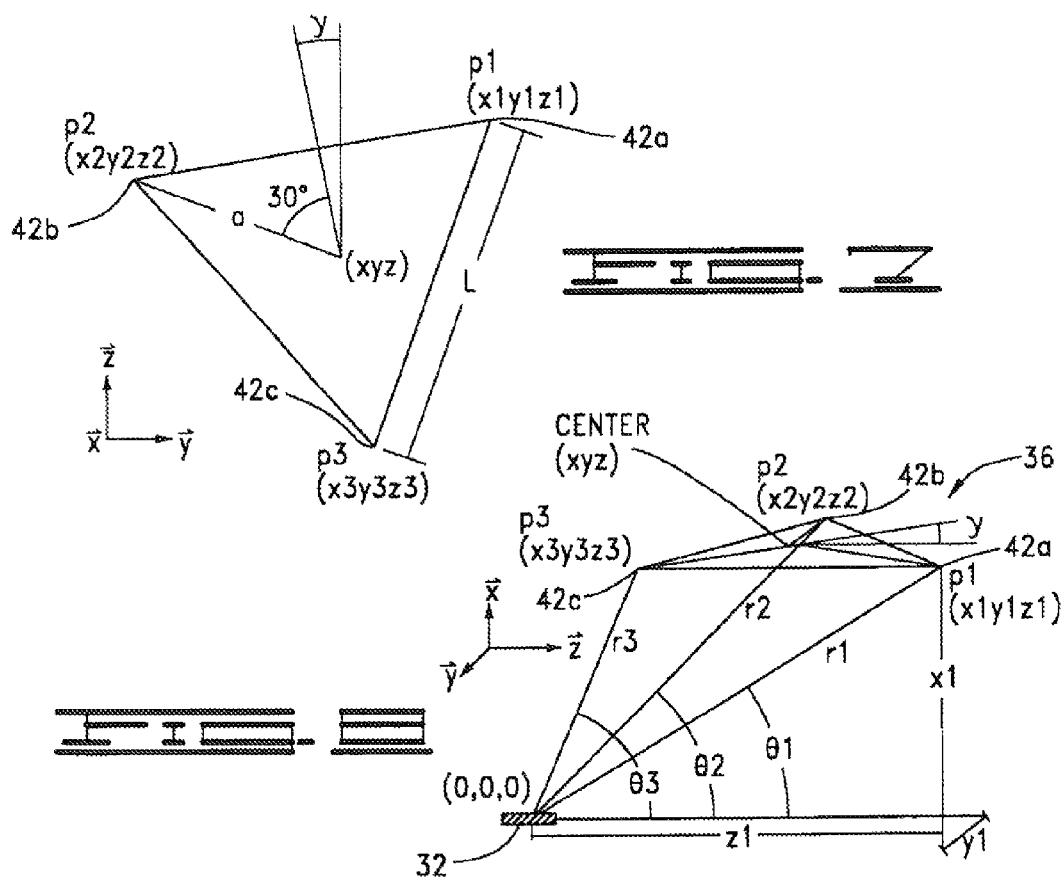

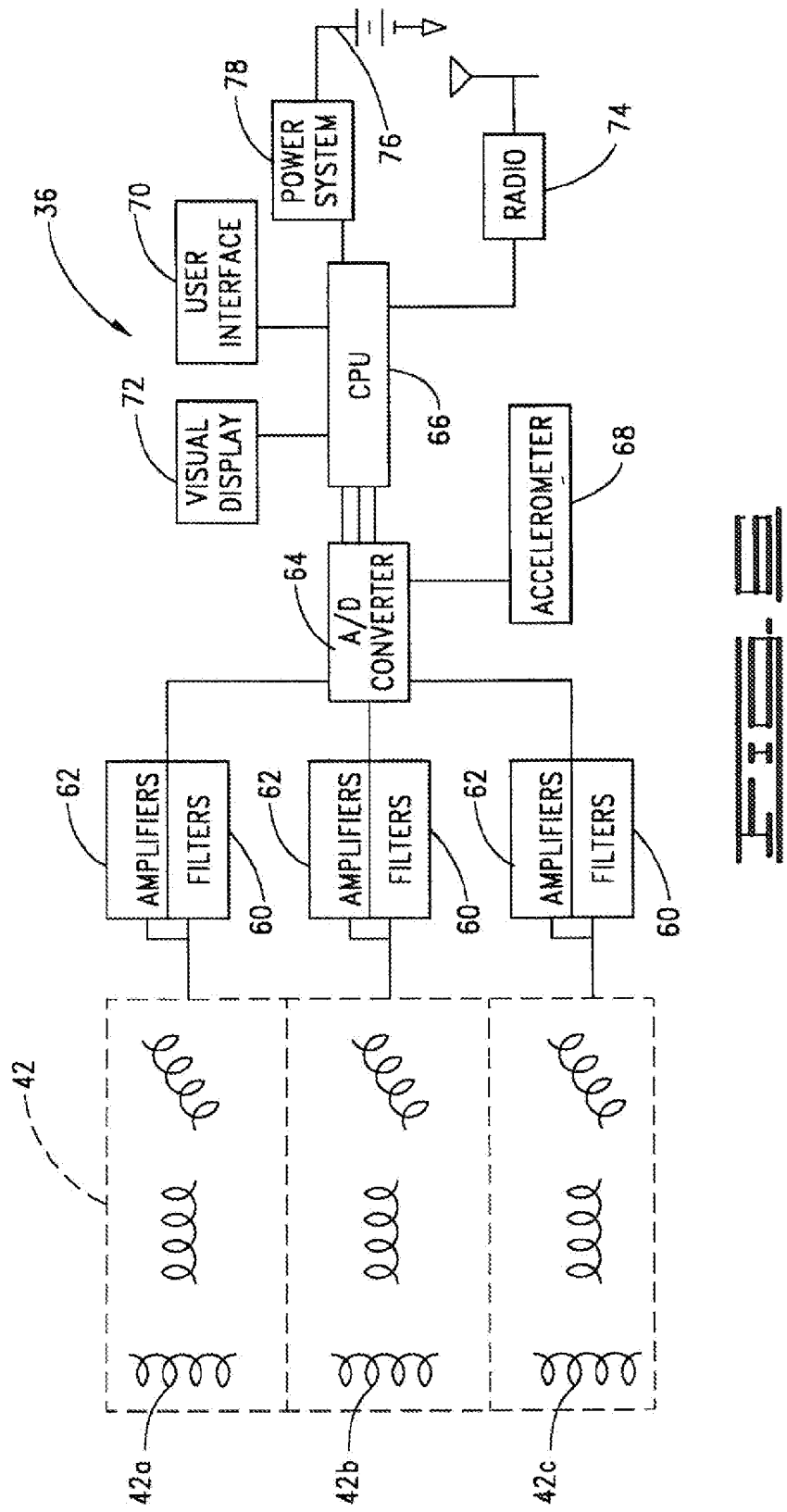

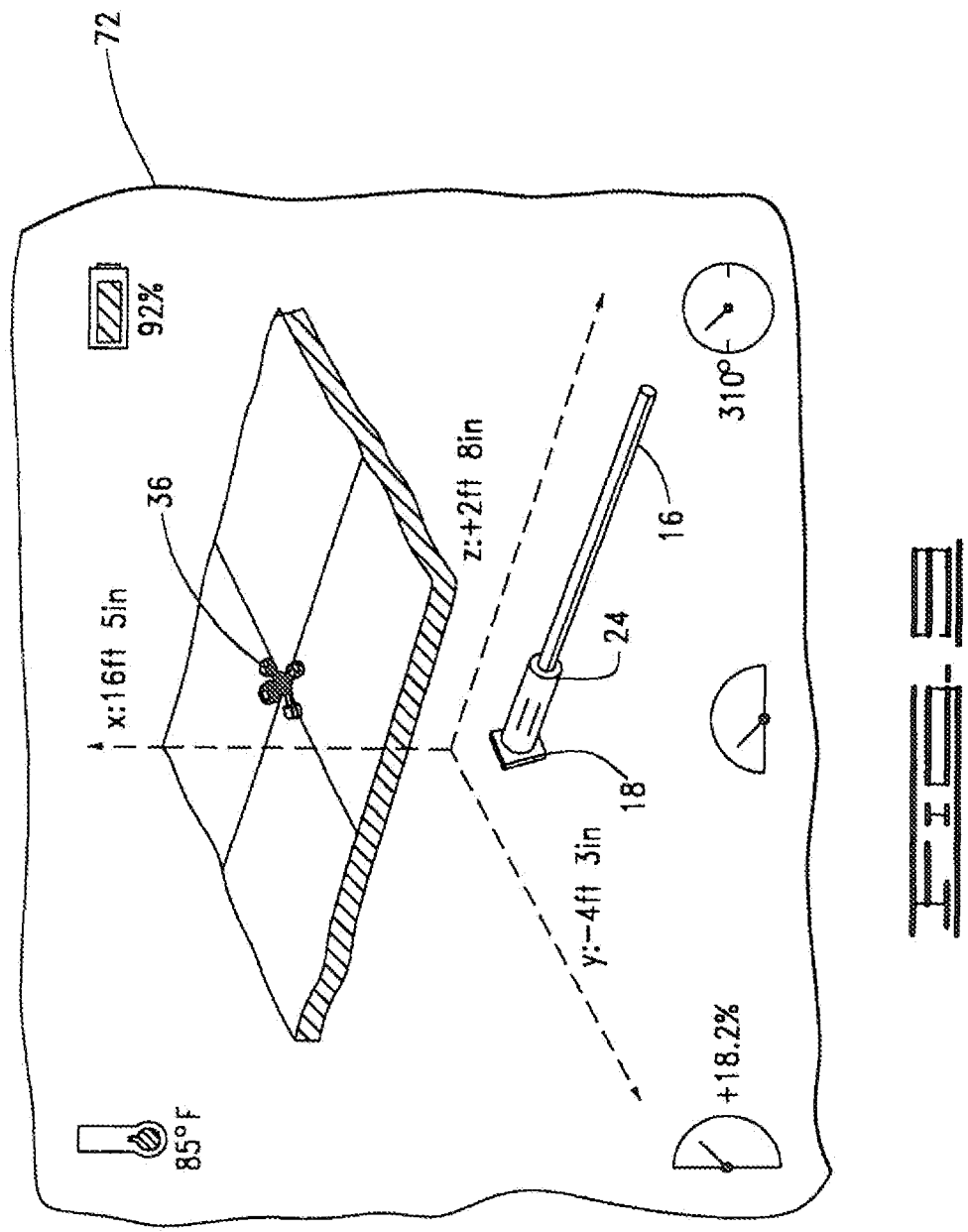

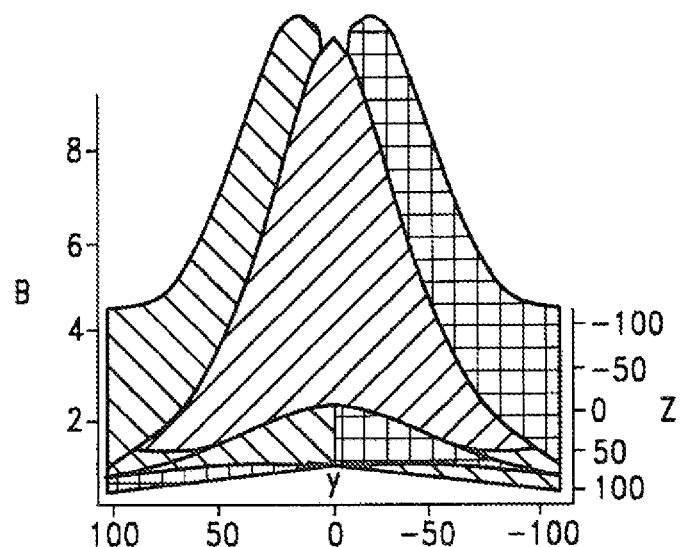
FIG. 10
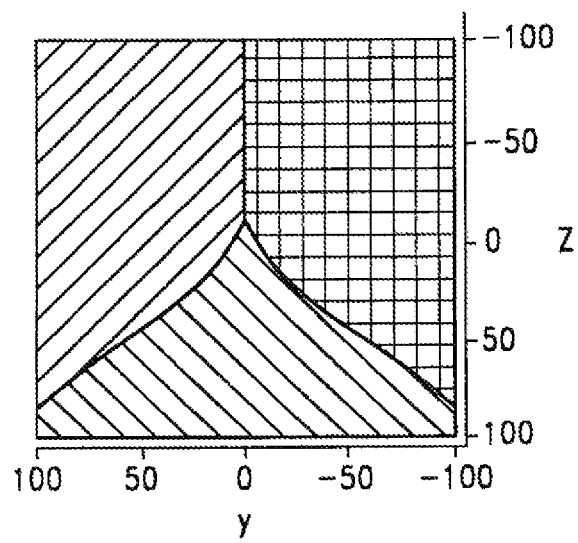
FIG. 11

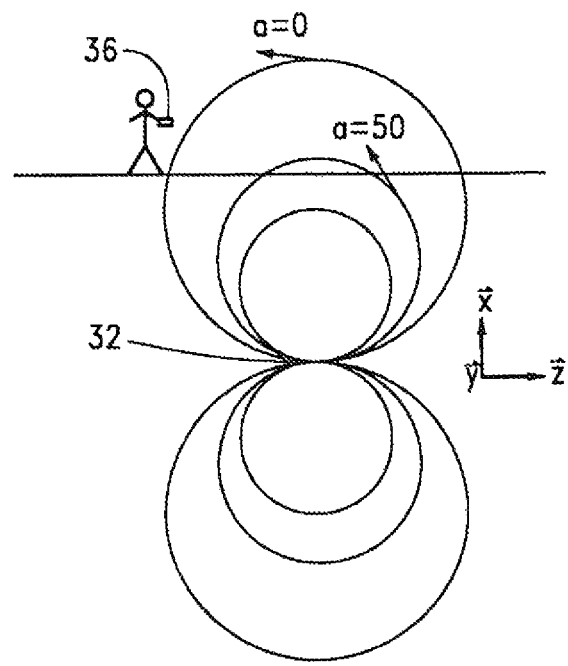
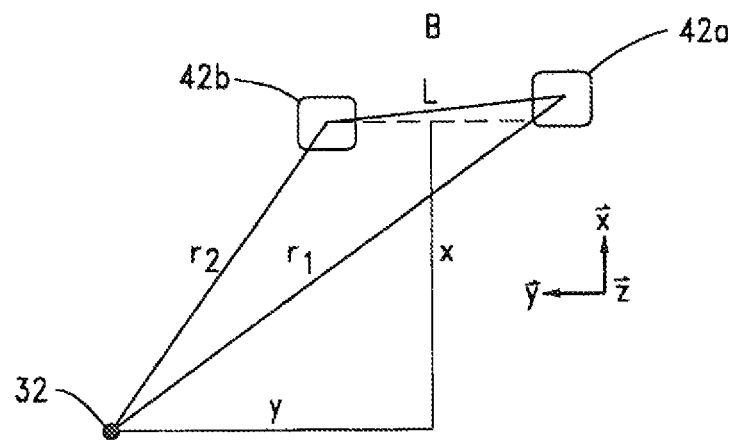
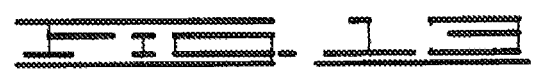

US 8,497,684 B2

DIPOLE LOCATOR USING MULTIPLE MEASUREMENT POINTS

CROSS REFERENCE TO RELATED APPLICATION

This application is a continuation of U.S. patent application Ser. No. 11/382,644, filed May 10, 2006, which claims the benefit of U.S. Provisional Patent Application No. 60/728,066, filed Oct. 19, 2005 and U.S. Provisional Patent Application No. 60/680,780, filed May 13, 2005, the contents of which are incorporated fully herein by reference.

FIELD OF THE INVENTION

The present invention relates generally to the field of locating underground objects, and in particular to locating and tracking a beacon within the field of operation of a horizontal drilling machine.

SUMMARY OF THE INVENTION

The present invention is directed to a receiver system for identifying a location of a magnetic field source. The receiver system comprises a frame, a first antenna assembly supported by the frame, a second antenna assembly supported by the frame, and a processor. Each antenna assembly is adapted to detect the magnetic field from the source. The processor is adapted to receive an antenna signal from each of the antenna assemblies and to determine a location of the source relative to the frame using the antenna signals.

The present invention is also directed to method for tracking a below ground source of a magnetic field. The method comprises simultaneously detecting in three dimensions a magnetic field from a source at each of at least two distinct points of a receiver frame. The method further comprises the step of determining a location of the source relative to the receiver frame using the detected field values.

The present invention is further directed to a horizontal directional drilling system. The system comprises a drilling machine, a drill string, a downhole tool assembly, and a receiver assembly. The drill string is operatively connected to the drilling machine. The downhole tool assembly is supported at a downhole end of the drill string and comprises a magnetic field transmitter. The receiver assembly comprises a frame, at least a first and second antenna assembly, and a processor. The first and second antenna assemblies are supported by the frame and adapted to detect a magnetic field from the magnetic field transmitter. The processor is adapted to receive an antenna signal from each of the antenna assemblies and to determine a location of the magnetic field transmitter relative to the frame using the antenna signals.

Further still, the present invention includes a method for drilling a horizontal borehole. The method comprises placing a receiver assembly, comprising a plurality of antenna assemblies, on the ground in proximity of a drill bit, wherein each antenna assembly comprises triaxial antennas and aligning the receiver assembly with a desired bore path. The drill bit is advanced forward without rotation to perform a steering correction in the horizontal plane. An orientation of the drill bit relative to the receiver assembly and a distance of forward advance of the drill bit without rotation are transmitted from the receiver assembly to the operator.

BRIEF DESCRIPTION OF THE DRAWINGS

FIG. 5 shows an alternative embodiment for an antenna assembly for use with the present invention.

FIG. 6 is a block diagram of a portable area monitoring system constructed to detect and process signals emanating from a boring tool.

FIG. 7 is a geometric representation of the relationship between the antenna arrangements of a receiver built in accordance with the present invention.

FIG. 8 is a geometric representation of the relationship between a transmitter and the antenna arrangements of a receiver built in accordance with the present invention.

FIG. 9 is representative visual display for a preferred embodiment of the present invention.

FIG. 10 is a graphical representation of total magnetic field readings from a transmitter as detected by a receiver in the y-z plane.

FIG. 11 is a graph showing the field readings of FIG. 9 in the y-z plane.

FIG. 12 is an illustration of flux lines radiating from a transmitter, as depicted in the x-y plane.

FIG. 13 is a geometrical representation of the relationship between a transmitter and a tilted receiver.

BACKGROUND OF THE INVENTION

The horizontal directional drilling (HDD) industry traditionally uses walk-over tracking techniques to follow the progress of a bore, to find the surface location immediately above the drill bit, and to determine the depth of the drill bit from that surface location. The primary tracking tools are a subsurface transmitter and a hand-carried surface receiver. The transmitter, located in or very near a boring tool, generally emits a magnetic dipole field created by a single coil dipole antenna. The transmitted dipole field can be used for both location and communication with the above ground receiver.

Conventional receivers often contain an arrangement of three antennas mounted in each of the three Cartesian axes. When the antenna arrangement senses the dipole field, the output of each antenna is proportional to the magnitude of the magnetic flux density as detected along the axis of the particular antenna. The signals from the antennas are mathematically resolved to provide information about the relative location of the boring tool. The process of locating the dipole, and thus the boring tool, currently involves two steps: determining its location along the z-axis (fore and aft) and then along the y-axis (left and right). One skilled in the art will appreciate a receiver can locate a transmitter in the fore-aft direction (along the z-axis) using the amplitude and phase of the transmitter's generated horizontal and vertical field components as measured in the vertical plane normal to the surface and extending through the transmitter axis (the x-z plane). A receiver can also determine the location of a single transmitter in the left-right directions using the amplitude and phase of the dipole field in the horizontal plane (the y-z plane). However, the left-right determination can only be used either in front of or behind the transmitter because there is no y component to the dipole field when the receiver is directly above the transmitter (such that z=0). There is currently no satisfactory method of simultaneously locating the transmitter in both the fore-aft and left-right directions with an antenna arrangement positioned directly over the transmitter.

DESCRIPTION OF THE INVENTION

Figure 1:
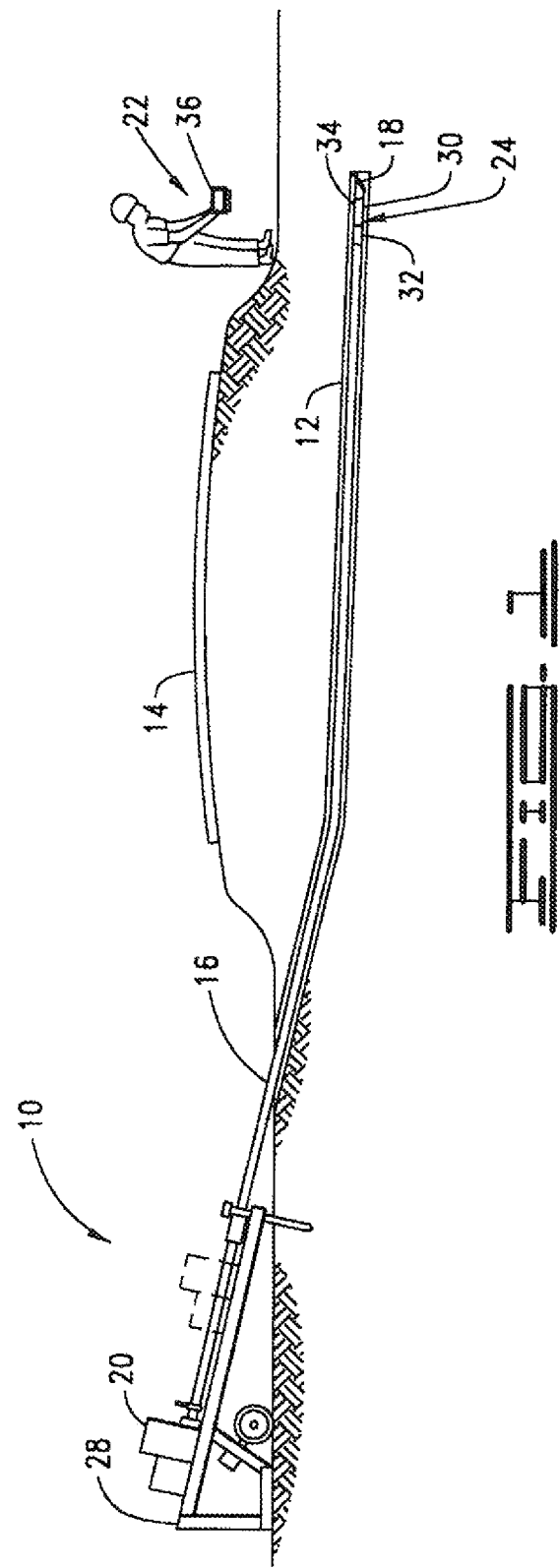
FIG. 1 is an illustration of a horizontal directional drilling system for drilling a horizontal borehole and a tracking system built in accordance with the present invention.

With reference now to the drawings in general, and FIG. 1 in particular, there is shown therein a horizontal directional drilling system ("HDD") system 10 for use with the present invention. FIG. 1 illustrates the usefulness of horizontal directional drilling by demonstrating that a borehole 12 can be made without disturbing an above-ground structure, namely a roadway or walkway as denoted by reference numeral 14. To cut or drill the borehole 12, a drill string 16 carrying a drill bit 18 is rotationally driven by a rotary drive system 20. When the HDD system 10 is used for drilling a borehole 12, monitoring the position of the drill bit 18 is critical to accurate placement of the borehole and subsequently installed utilities. The present invention is directed to a system 22 and method for tracking and monitoring a downhole tool assembly 24 during a horizontal directional drilling operation.

The HDD system 10 of the present invention is suitable for near-horizontal subsurface placement of utility services, for example under the roadway 14, building, river, or other obstacle. The tracking system 22 for use with the HDD system 10 is particularly suited for providing an accurate three-dimensional locate of the downhole tool assembly 24 from any position above ground. The locating and monitoring operation with the present tracking system 22 is advantageous in that it may be accomplished in a single operation. The present invention also permits the position of the downhole tool assembly 24 to be monitored without requiring the tracking system 22 be placed directly over a transmitter in the downhole tool assembly. These and other advantages associated with the present invention will become apparent from the following description of the preferred embodiments.

With continued reference to FIG. 1, the HDD system 10 comprises the drilling machine 28 operatively connected by the drill string 16 to the downhole tool assembly 24. The downhole tool assembly 24 preferably comprises the drill bit 18 or other directional boring tool, and an electronics package 30. The electronics package 30 comprises a transmitter 32 for emitting a signal through the ground. Preferably the transmitter 32 comprises a dipole antenna that emits a magnetic dipole field. The electronics package 30 may also comprise a plurality of sensors 34 for detecting operational characteristics of the downhole tool assembly 24 and the drill bit 18. The plurality of sensors 34 may generally comprise sensors such as a roll sensor to sense the roll position of the drill bit 18, a pitch sensor to sense the pitch of the drill bit, a temperature sensor to sense the temperature in the electronics package 30, and a voltage sensor to indicate battery status. The information detected by the plurality of sensors 34 is preferably communicated from the downhole tool assembly 24 on the signal transmitted by the transmitter 32 using modulation or other known techniques.

Figure 2:
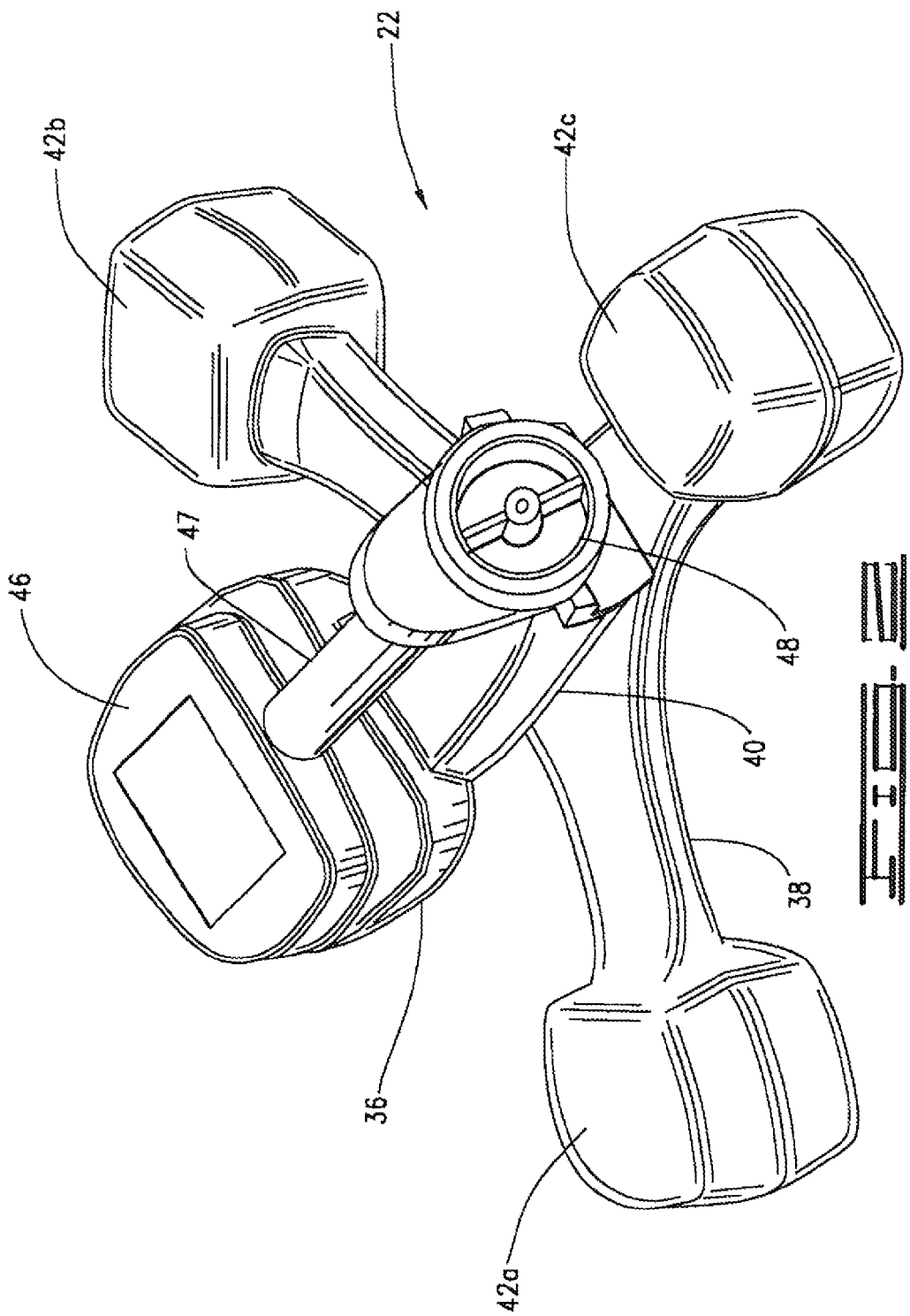
FIG. 2 is a perspective view of a receiver assembly constructed in accordance with the present invention.

With reference now to FIG. 2, shown therein is a preferred embodiment of the tracking system 22 of the present invention. The tracking system 22 comprises a receiver assembly 36. The receiver assembly 36 comprises a frame 38, a computer processor 40, and a plurality of antenna arrangements 42 supported by the frame. The processor 40 is supported on the frame 38 and operatively connected to the plurality of antenna arrangements 42. The frame 38 is preferably of lightweight construction and capable of being carried by an operator using a handle 44. In a preferred embodiment, the receiver assembly 36 also comprises a visual display 46 and a battery 48 for providing power to the various parts of the receiver assembly. The visual display 46 may be adapted to provide a visual representation of the tracking system 22 relative to the drill bit 18 and other information useful to the operator. The receiver assembly 36 may also comprise a transmitting antenna (not shown) for transmitting information from the receiver assembly to the drilling machine 28 or other remote system (not shown).

The antenna arrangements 42 are supported on the frame 38 and separated from each other by a known distance and in known relative positions. One skilled in the art will appreciate the separation and relative position of the antenna arrangements 42 may be selected based on the number of antenna arrangements and antenna design, size, and power. In the preferred embodiment of FIG. 2, the plurality of antenna arrangements 42 comprises a first 42a, a second 42b, and a third 42c antenna arrangement. Preferably, the antenna arrangements 42 are mounted in a plane and at the vertexes of an equilateral triangle. One skilled in the art will appreciate a greater distance or spread between the antennas will provide better resolution and accuracy. A workable compromise between spread and physical size has been found to be a separation distance of at least 18 inches. Other receiver configurations are possible, as long as each antenna arrangement 42 is capable of isolating the magnetic field in each of the Cartesian axes at the point on the frame 38 where the antenna is positioned. For example, the invention contemplates a fourth antenna arrangement that may be supported by the frame 38 at position either above or below the plane formed by the first 42a, second 42b, and third 42c antenna arrangements.

Each of the plurality of antenna arrangements 42 is preferably a tri-axial antenna. More preferably, each antenna arrangement 42 is adapted to measure the total magnetic field at its respective position on the frame 38. Preferably, each antenna arrangement 42 will comprise three orthogonal antennas which measure the magnetic field along their specific axis of sensitivity. Each of the three orthogonal antenna signals is squared, summed, and then the square root is taken to obtain the total field. This calculation assumes the sensitivities of each antenna are the same and that the center of each antenna is coincident with the other two such that the antenna arrangement is measuring the total field at a single point in space.

Figure 3:
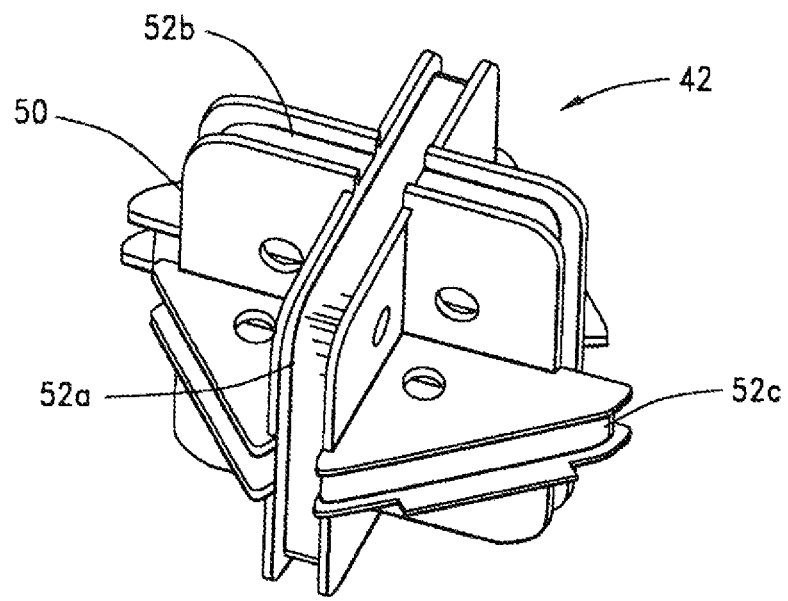
FIG. 3 is a perspective, partially cut-away view of a support structure for an antenna assembly for use with the present invention.
Figure 4:
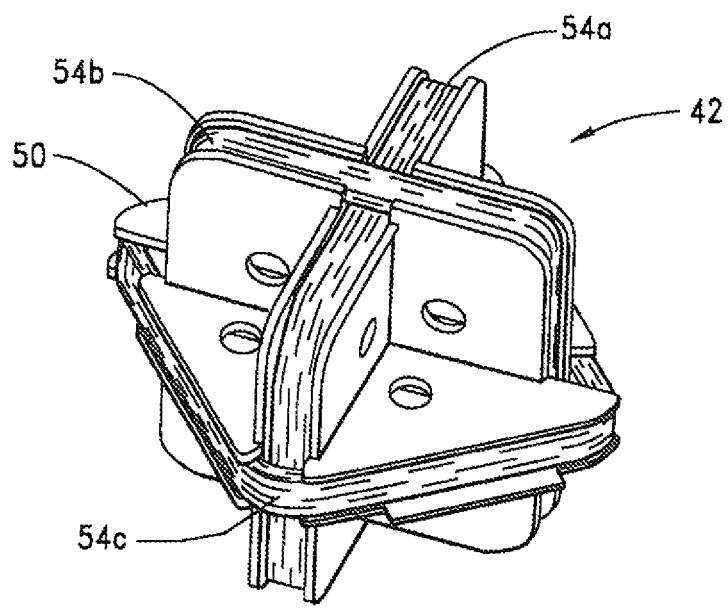
FIG. 4 is a perspective, partially cut-away view of the antenna assembly from FIG. 3.

Referring now to FIGS. 3 and 4, there is shown therein the preferred embodiment for an antenna arrangement 42 for use with the present invention. The antenna arrangement 42 comprises a support structure 50 defining three channels 52. The support structure 50 is preferably formed of lightweight plastic. For ease of construction, the structure 50 may be manufactured in at least two parts that are secured together. The structure 50 is preferably manufactured in such a way that three channels 52 are each dimensionally identical. More preferably, the support structure 50 has a substantially cubical shape and each of the three channels 52 defines a rectangular aperture area having a center point. Most preferably, the channels 52 are mutually orthogonal and oriented so that the center points are coincident.

The channels 52 are orthogonally oriented such that a first channel 52a is circumvented by a second channel 52b, and a third channel 52c circumvents the first channel and the second channel. A preferred embodiment for such an arrangement comprises an orientation where a long side of the rectangular second channel 52b is adjacent to and perpendicular to a short side of the rectangular first channel 52a, and a diagonal of the rectangular third channel 52c is substantially coincident with a plane formed by the rectangular second channel. The size of the antenna 42 can be optimized by designing the channels 52 such that the diagonal of the third channel 52c intersects the plane of the second channel 52b at an angle of between 0-10 degrees. Most preferably, the diagonal of the third channel 52c will intersect the plane of the second channel 52b at an angle of approximately 4 degrees.

Shown in FIG. 4, the antenna arrangement 42 further comprises three antenna coils 54. The coils 54 are preferably insulated windings of magnet wire. The three coils 54 are separately wound around the structure 50, one in each of the three channels 52a, 52b, and 52c, to form three coil loops 54a, 54b, and 54c. Because of the orientation of the channels 52a, 52b, and 52c, as previously described, the coils 54a, 54b, and 54c do not intersect each other when positioned in the channels. Preferably, the coils 54 comprise approximately 100 turns of magnet wire, though other numbers of turns may be used depending on wire size and antenna sensitivity or other design considerations. Due to the channel configuration, the coil loops 54 all have coincident center points, and their sensitivities are substantially identical. The coil loops 54 also define substantially identical aperture areas and have rounded corners. Since the coils 54 are wound with magnet wire, their resistances are relatively low. Therefore, the antenna 42 can be tuned properly to increase its sensitivity, thus allowing the receiver 36 to detect the magnetic field from greater depths.

Applicants' invention also contemplates other embodiments for the antenna arrangement 42, including use of traditional ferrite rod antennas. For example, though not shown, the antenna arrangement 42 could comprise three ferrite rod antennas in orthogonal relationship. However, the antenna arrangement 42 having coil windings 54 shown in FIG. 4 has significant advantages over the use of traditional ferrite rod antennas. Ferrite rods greatly enhance the sensitivity of the antenna, thus enabling the receiver to work to deeper depths. However, the ferrite properties are not constant over a temperature range. If a high level of accuracy is required, the drift over the temperature range experienced on work sites is unacceptable. Also, the center of each antenna would obviously not be coincident with the center of the other antennas. This will introduce errors in the total field calculation.

Referring now to FIG. 5; there is shown therein an alternative embodiment for the antenna arrangement 55 for use with the present invention. As shown in FIG. 5, the antenna arrangement 55 comprises three tri-axial antennas made of printed circuit boards 56 (PCBs). Preferably, the PCBs 56 are supported on a mount 58 and configured as a cube. In a cubic configuration, opposite PCBs 56 are connected in series. The PCBs 56 are preferably comprised of many connected layers, allowing the winds to be connected in series to increase the number of turns, and therefore the inductance of the antennas. When configured as a cube, the PCBs 56 antennas can be mounted such that their respective axes are perpendicular and a geometric center of the antenna arrangement 55 will not change as the antenna arrangement is maneuvered.

Using PCBs 56 for the antenna arrangement 55 also has significant advantages. The cubic arrangement of the PCBs 56 allows the observation point for calculation of the total field sensed by the antenna arrangement 55 to remain at the geometric center of the antenna. Additionally, as PCBs are manufactured by precision machines, tolerances associated with manually wrapping the loops are reduced. The antennas produced in this fashion are very uniform from one board to the next and less expensive to manufacture. Higher precision measurements will be possible with this configuration.

With reference now to FIG. 6, shown therein is a block diagram of the preferred embodiment of the receiver assembly 36 of the present invention. The antenna arrangements 42, as described earlier, measure a change in the magnetic field. A change in the magnetic field sensed will result in a voltage being induced in response to the transmitter's magnetic field. The voltages from the antennas 42 are sent to filters 60 and amplifiers 62. Filters 60 eliminate the effects of other signals received by the antennas 42 from local noise sources. Amplifiers 62 increase the signal received by the antennas 42. An A/D converter 64 is used to convert analog waveform information into digital data.

The digital data from the A/D converter 64 is then sent to a central processor 66 (CPU) to calculate the location of the transmitter 32 relative to the receiver assembly 36. The CPU 66 may comprise a digital signal processor (DSP) and a microcontroller. The CPU 66 decodes the information from the A/D converter 64 and performs calculations to determine the location of the transmitter in a manner yet to be described. The CPU 66 may also discern information transmitted on the magnetic field, to determine the battery status, pitch, roll, and other information about the downhole tool assembly 24.

The receiver assembly 36 may also comprise one or more sensors 68 used to sense operational information about the receiver assembly 36. For example, one or more accelerometers, or other known inclination and orientation sensors or magnetic compasses, may provide information concerning the roll or tilt of the receiver 36. Information from the sensors 68 is provided to the A/D converter 64 and to the CPU 66 where the DSP may make calculations to compensate for the receiver 36 not being level.

In the preferred embodiment the receiver assembly 36 further comprises a user interface 70 having plurality of buttons, joysticks, and other input devices. The operator can input information for use by the CPU 66 through the user interface 70. Information entered through the user interface 70 or determined or used by the CPU 66 may be displayed to the operator on a visual display 72 screen. The receiver assembly 36 also comprises a radio antenna 74 for transmitting information from the CPU 66 to a remote unit, such as at the drilling machine 10.

The receiver 36 is preferably powered by a battery assembly 76 and power regulation system 78. The battery assembly 76 may comprise multiple D-cell sized batteries, though other sources are contemplated, such as rechargeable batteries. The power regulation system 78 may comprise a linear regulator or switch mode regulator to provide power to the various components of the receiver 36.

The receiver assembly 36 of the present invention uses multiple points of measurement, at the plurality of antenna arrangements 42, to accurately locate the transmitter 32 in three-dimensional (3-D) space. Each antenna arrangement 42 obtains three distinguishable orthogonal components of a magnetic field available at any position. In the preferred embodiment described above, the three antennas 42a, 42b, and 42c, provide those magnetic field measurements.

Referring now to FIGS. 7 and 8, shown therein are the relationship of the antenna arrangements 42 to the transmitter 32 and the geometries involved. With three points of measurements from the antennas 42, the location of the transmitter 32 can be found in 3-D space by the receiver assembly 36 at any point on the ground using the equations below.

The Dipole Equations for the Null Field, the field perpendicular to the earth's surface, and Total Field are:

$$B_x = k \cdot \frac{3 \cdot z^2 - r^2}{r^5} \tag{1}$$

$$B_y = 3k \cdot \frac{y \cdot z}{r^5} \quad (2)$$

$$B_z = 3k \cdot \frac{x \cdot z}{r^5} \quad (3)$$

$$B_T = k \cdot \frac{\sqrt{3 \cdot z^2 + r^2}}{r^4} \quad (4)$$

where $r^2 = x^2 + y^2 + z^2$, and k is a calibration constant. These equations assume that the receiver 36 is flat ($x_1 = x_2 = x_3 = x$) and above the transmitter 32 (x>0). However, one skilled in the art will appreciate the ability to account for tilt of the receiver 36 with information received from the sensors 68 and the pitch of the transmitter 32 with information received from the downhole tool assembly 24.

Referring to FIG. 7, the equations relating each of the points of measurement (at the antennas 42a, 42b, and 42c) on the receiver 36 to (x, y, z) are:

$$y_1 = y + \frac{\sqrt{3}}{3} \cdot L \cdot \cos\left(\frac{\pi}{6} + \gamma\right) \quad z_1 = z + \frac{\sqrt{3}}{3} \cdot L \cdot \sin\left(\frac{\pi}{6} + \gamma\right) \quad (4a)$$

$$y_2 = y - \frac{\sqrt{3}}{3} \cdot L \cdot \cos\left(\frac{\pi}{6} - \gamma\right) \quad z_2 = z + \frac{\sqrt{3}}{3} \cdot L \cdot \sin\left(\frac{\pi}{6} - \gamma\right) \quad (4b)$$

$$y_3 = y + \frac{\sqrt{3}}{3} \cdot L \cdot \sin(\gamma) \quad z_3 = z - \frac{\sqrt{3}}{3} \cdot L \cdot \cos(\gamma) \quad (4c)$$

Also, it can be seen from FIG. 8 that $$\cos\theta_1 = \frac{z_1}{r_1}$$

or $z_1 = r_1 \cdot \cos\theta_1$. The same is true for the other points, so in general $z_i = r_i \cdot \cos\theta_i$.

Adjusting for a tilted receiver 36, the rotated coordinate system gives the following:

(note that the $\overset{\rho}{y}$ axis is unaffected)

$$\overset{\rho}{z'} = \overset{\rho}{z}\cos P + \overset{\rho}{x}\sin P \quad \overset{\rho}{x'} = -\overset{\rho}{z}\sin P + \overset{\rho}{x}\cos P$$

$$z' = z\cos P + x\sin P \quad x' = -z\sin P + x\cos P$$

Solving for $$B_x^\rho : B_{x'}^\rho = 3k \cdot \frac{x' \cdot z'}{r^5}\overset{\rho}{x'} + k \cdot \frac{3 \cdot z'^2 - r^2}{r^5}\overset{\rho}{z'}.$$

Plugging in the rotated values and simplifying gives:

$$B_x^\rho = k \cdot \frac{3 \cdot x^2 \cdot \sin P + 3 \cdot x \cdot z \cdot \cos P - r^2 \cdot \sin P}{r^5}\overset{\rho}{x}.$$

These equations provide measurable parameters regardless of pitch, and the system of equations can be written as follows:

$$B_{x,i}^\rho = k \cdot \frac{3 \cdot x^2 \cdot \sin P + 3 \cdot x \cdot z_i \cdot \cos P - r_i^2 \cdot \sin P}{r_i^5} \quad \text{(3 equations, } i = 1, 2, 3)$$

$$B_{T,i} = k \cdot \frac{\sqrt{3 \cdot (z_i \cos P + x \sin P)^2 + r_i^2}}{r_i^4} \quad \text{(3 equations, } i = 1, 2, 3)$$

There are now six equations ($B_{x,1}^\rho$, $B_{x,2}^\rho$, $B_{x,3}^\rho$, $B_{T,1}$, $B_{T,2}$, $B_{T,3}$) and five unknowns (x, y, z, k, γ) and the system can be solved with any number of known methods. One skilled in the art will appreciate that since k is determined from the above equations, there is no calibration required to use this system.

The present invention can therefore be used to identify the exact coordinates of the receiver 36 relative to the transmitter 32 using the magnetic field measurements from the plurality of antenna arrangements 42 and the equations above. The present invention can be used to identify the location of the transmitter 32 in 3-D space without any additional movements, as long as the magnetic field from the transmitter can be detected by the plurality of antenna arrangements 42. The information concerning the location of the transmitter 32 is preferably provided to the operator using the visual display 72.

There is shown in FIG. 9 a preferred configuration of a screen display 72. The drill string 16 is shown underground. The x-, y-, and z-coordinates are the distances to the downhole tool assembly 24 from the receiver 36 location. A receiver icon is also on the grid to graphically show the relationship of the receiver 36 to the transmitter 32. Transmitter 32 temperature, battery status, pitch, roll, yaw, signal strength, signal gain, and signal frequency icons are also shown on the display 72 to provide a graphic and numeric representation of each. Other downhole tool 18 data or operational information could similarly be displayed. This allows the downhole tool assembly 24 position to be monitored and determined without requiring the receiver 36 to be placed directly over the transmitter 32. All data may be stored in memory or a database to log the history of each bore. Many other functions may be made available thru the main menu such as changing units, calibration mode, alternate two-dimensional view, and demonstrations and help.

In an alternative embodiment, the receiver assembly 36 of the present invention can also be used with certain directed steps to take advantage of situations where the transmitter 32 strength or sensitivity of the plurality of antenna arrangements 42 does not permit the 3-D location as described above. In such a case, use of the receiver assembly 36 involves location of a particular spot directly behind the transmitter 32 before pinpointing the location of the transmitter. However, with the multiple measurement points available at the plurality of antenna arrangements 42 of the receiver 36, the receiver can easily direct an operator to the proper spots to ease determination of the location of the transmitter. The alternative use involves a process of using the visual display 72 to first direct the operator to a position directly behind and oriented in the same direction as the downhole tool assembly 24 and then to a position directly above the downhole tool assembly.

In the first step of the alternative embodiment, the operator uses the receiver 36 to find a location where the total magnetic field reading for each of the plurality of antenna arrangements 42 is the same and the receiver is rotationally aligned with the transmitter 32. This step is preferably accomplished simultaneously, using the display 72 to direct the operator to the desired location.

The spot where the magnetic field reading at each antenna arrangement 42a, 42b, and 42c is the same is where, from the equations above, $B_{1T}=B_{2T}=B_{3T}$. FIGS. 10 and 11 are graphic illustrations of the total magnetic field readings as the receiver 36 is moved within the y-z plane for a constant depth and for a receiver rotationally aligned with the transmitter 32 (so that γ=0). The operator can be directed to the point where the field strengths are the same using the readings from the plurality of antenna arrangements 42 and the following calculations.

First, calculate $$\bar{r}_i = \sqrt[3]{k/B_{1T}}. \text{ Then } V_{1-2} = \frac{\bar{r}_1 - \bar{r}_2}{L}, V_{1-3} = \frac{\bar{r}_1 - \bar{r}_3}{L}, \text{ and } V_{2-3} = \frac{\bar{r}_2 - \bar{r}_3}{L}. \text{ And then } V_y = V_{1-2} \text{ and } V_z = V_{2-3} \cdot \cos\frac{\pi}{6} + V_{1-3} \cdot \cos\frac{\pi}{6}.$$

These vectors can be shown in two-dimensional (2-D) space to direct the operator to the spot where the vectors are 0, where $B_{1T}=B_{2T}=B_{3T}$.

At the same time, the display 72 can be used to direct the operator to rotate the receiver assembly 36 so that the receiver is directionally aligned with the transmitter 32 and, consequently, the downhole tool assembly 24. One skilled in the art will appreciate that the location of the spot where the magnetic fields are equal at each of the plurality of antenna arrangements 42 ($B_{1T}=B_{2T}=B_{3T}$) will be different if the receiver 36 is not aligned with the transmitter 32 (when γ≠0). Therefore the receiver 36 must be rotated properly to ensure the correct spot is found. The receiver assembly 36 will be aligned with the transmitter 32 when the flux line through the antenna assembly 42c at the back end of the receiver (the "rear pod") is along the z-axis. By using the display 72 to show the operator the angle at which the flux impinges the rear pod 42c, the user can align the receiver 36 with the flux lines and keep it rotated properly.

When these steps are followed and the operator is directed to the spot where all conditions are met, then the receiver will be located with y=0 and γ=0. This spot is easily found, requires little computation, and greatly simplifies the location process. The next step in the process is to direct the operator to move the receiver 36 to a position directly above the transmitter 32 to precisely locate the downhole tool assembly 24.

Referring now to FIG. 12, there is shown therein a graphical depiction of flux lines radiating from the transmitter 32 in the x-z plane. Assuming the pitch of the receiver 36 is 0, note that the angle α⇒0 as z⇒0. Therefore, the receiver 36 preferably displays this angle graphically to the operator, and the operator can move the receiver until this condition is true. At this point, each of the front antenna arrangements 42a and 42b (the "front pods") will be located on the line where z=0, and the transmitter 32 located in between and directly below the front pods 42a and 42b.

One skilled in the art will appreciate that when the magnetic field is measured at z=0, then $$r = \sqrt[3]{k/B_T}.$$

Since the receiver 36 is located where z=0 if the above steps have been followed, then the geometry shown in FIG. 13 can be used to calculate the depth, x, of the transmitter 32. As previously discussed, the receiver 36 may contain sensors 68 to account for tilt of the receiver and enable the calculation of β. Then, as $r_1$, $r_2$, L, and β are known values, x can be solved for through known geometry. The value for y can also be determined in the event that the receiver 36 has been moved slightly off of the line y=0. The operator can be directed to move the receiver until y=0 in order to be positioned to get a proper depth reading.

The process allows the receiver assembly 36 to be used to locate the downhole tool assembly 24 quickly and accurately, with few steps and little computation. It should also be noted that the step for finding the spot where the magnetic field strengths in each of the antenna arrangements 42 are equal is only necessary when the operator does not have a relative idea of where the transmitter 32 is located. If the general location of the downhole tool assembly 24 is known, then the operator can use the receiver 36 to find the line where z=0, and then the depth of the transmitter 32.

With the present invention, improved methods for directing and drilling a horizontal directional borehole 12 are also possible. For example, trackers and beacons used for directional drilling generally do not indicate how much the drill bit is moving as an HDD system 10 is used to make steering corrections to redirect the borehole 12. Currently, steering corrections are dependent on machine operators' expertise. The present invention removes the uncertainty of operators' guesswork. With the present invention, the receiver 36 can indicate at any given point in time the precise relative location of the downhole tool assembly 24 and the drilling bit 18.

In an improved method for boring, the receiver 36 can be set on the ground with a centerline of the receiver directly on the desired path for the borehole 12. The display 72 can then be used to provide the operator with immediate feedback of the location and heading of the drill bit 18 relative to the desired path.

A method for creating a horizontal directional borehole 12 in the earth is also accomplished with the following steps. First, the receiver assembly 36 is placed on the ground in the proximity of the drill bit 18 with the longitudinal display axis of the receiver assembly aligned with the desired bore path 12. As the drill bit 18 is advanced forward without rotation to perform a steering correction in the horizontal plane, an image of the orientation of the drill bit relative to the receiver 36 can be transmitted from the receiver to the HDD system 10 and its operator. Additionally, the distance of forward advance of the drill bit 18 without rotation can be determined at the receiver 36 and that information also transmitted from the receiver to the HDD system 10. Such techniques are useful when boring on-grade boreholes or when desiring to bore to a point where the receiver 36 is positioned.

The present invention also contemplates an improved method for communicating information from the downhole tool assembly 24 to the receiver assembly 36. As is well known in the art, the electronics package 30 in the downhole tool assembly 24 will generally comprise batteries to provide operating power for the transmitter 32 and sensors in the electronics package. However, the need to obtain reasonable operating life from a battery-powered transmitter 32 gives rise to a number of difficult engineering tradeoffs. The transmitter's 32 maximum operating depth depends on many factors, but power dissipation in the transmitter is a major—if not the dominant—consideration. A transmitter's 32 operating life is also determined by the battery stack's energy capacity. Thus, the designer is forced to make a compromise between operating depth, which favors higher operating power and shorter operating life, and operating life, which favors lower power and reduced operating range. These are fundamental design tradeoffs for any battery-powered transmitter 32.

For improved performance, the present invention contemplates an adaptation of a data transmission technique known as Manchester coding. Other data transmission variants may have similar characteristics. Although the invention will be described in terms of Manchester coding, the invention may be used with any data transmission technique meeting similar data signal criteria.

Traditional serial digital transmission schemes commonly divide a data stream into small time intervals known as bit cells, data cells, or bit intervals, representing the amount of time needed to convey one bit of binary data. The simplest coding schemes rely on single-level signals during each bit cell. Other coding schemes use somewhat more elaborate waveform constructs for specific reasons. For example, within a very commonly-used family known as NRZ (Non-Return-to-Zero) codes there are either zero or one transition in a bit period. Members of this code family are:

NRZ-L (-Level), in which a high level represents a "1" and a low level represents a "0", NRZ-M (-Mark), in which a "1" is represented by a transition and a "0" by no transition in the bit period, NRZ-S (-Space), in which a "0" is represented by a transition and a "1" by no transition in the bit period.

NRZ-L is seen to be the most common (and intuitive) of the data codes.

This invention disclosed concerns a member of the Biphase code family in which there are at least one but no more than two transitions in a bit period. The particular code of interest is Biphase-L (-Level), in which a "1" or "0" is represented by a level transition in the middle of the bit interval. Biphase-L is commonly known as Manchester or Manchester II code. Manchester II or Biphase-L code occasionally is further subdivided into Bipolar One (logic "0" is defined as a low-to-high or rising edge transition in the middle of the bit period, or Bipolar Zero (a logic "0" is defined as a high-to-low or falling transition in the middle of the bit period. The Bipolar One and Bipolar Two waveforms are logical complements of one another and both are commonly made available by integrated circuit devices which encode and decode Manchester data streams. For simplicity, this disclosure refers to only "Manchester" code, which should be understood to represent all variants of the basic code structure (whether known as Manchester, Manchester II, or Biphase-L). It is significant that Manchester code is self-clocking, which is to say data synchronization may be established and maintained using the fact there is a guaranteed transition at the midpoint of each bit cell.

The primary advantages attending use of Manchester code in HDD tracking beacons arise from the guaranteed transitions in the signal waveform. Equivalently, the signal waveform will be high for one half of each bit cell and low for the other half of each bit cell. In typical data transmission applications, the high and low signal transactions involve transitions between two different voltage levels. However, in HDD applications this property may be used advantageously in at least two different ways:

(1) by tuning the beacon transmitter on or off to represent a signal condition (the "1" state) and a no signal condition (the "0" state), respectively, or (2) by frequency shifting the beacon transmitter frequency in or out of a bandpass filter passband to represent the "1" and "0" states, respectively. In other words, the in-band signal frequency is generated during the high portion of the Manchester waveform and an out-of-band signal frequency is generated during the low portion of the Manchester waveform.

For simplicity, let alternative (1) be called Manchester/OOK (Manchester On-Off Keying) and let alternative (2) be called Manchester/FSK (Manchester Frequency Shift Keying).

Manchester/OOK coding is especially desirable. It guarantees the beacon signal will be off half the time data is being transmitted, effectively resulting in a 50% power savings relative to frequency shift keyed (FSK) and phase shift keyed (PSK) data transmissions. Of equal importance, however, is the fact that the received signal amplitude may be simply and accurately averaged over several bit cells while data is being transmitted. This simplifies the software needed to accurately determine depth from transmitted data.

Manchester/FSK coding, on the other hand, provides no power savings relative to FSK or PSK transmission, but it does provide greater operational flexibility. This arrangement presumes one or more digital bandpass filters, each identified by different filter coefficients, and the ability to generate a number of different FSK waveforms, also determined by coefficients in software. The bandpass filter response will produce an output very similar to Manchester/OOK coding as the FSK signal moves in and out of the bandpass filter passband. Although there is no power savings, there is great operational flexibility—the operator may select the operating frequency from a number of different frequency and filter combinations to obtain the combination offering the best overall performance in the presence of local noise or other interference.

Various modifications can be made in the design and operation of the present invention without departing from its spirit. Thus, while the principal preferred construction and modes of operation of the invention have been explained in what is now considered to represent its best embodiments, it should be understood that within the scope of the appended claims, the invention may be practiced otherwise than as specifically illustrated and described.

What is claimed is:

1. A method for tracking a below ground source of a dipole magnetic field, the method comprising:
   simultaneously detecting in three dimensions the dipole magnetic field from the below ground source at each of at least two horizontally disposed distinct points of a receiver frame; and
   determining a location of the below ground source relative to the receiver frame using the detected field values.

2. The method of claim 1 further comprising the step of displaying the location of the below ground source relative to the receiver frame.

3. The method of claim 1 further comprising the step of determining the distance between the below ground source and the receiver frame.

4. The method of claim 1 further comprising the steps of:
   moving the receiver frame to a point directly above the below ground source of the dipole magnetic field; and
   calculating the depth of the below ground source of the dipole magnetic field.

5. The method of claim 1 further comprising the steps of:
   simultaneously detecting in three dimensions the dipole magnetic field from the below ground source at a third distinct point of the receiver frame;
   locating a point where the detected dipole magnetic field is the same at each of the three distinct points; and
   moving the receiver frame to a point directly above the below ground source of the dipole magnetic field.

6. The method of claim 5 wherein the step of locating a point where the detected dipole magnetic field is the same at each of the three distinct points is accomplished by measuring the total field amplitudes of the detected signals.

7. The method of claim 6 further comprising the step of rotating the receiver frame to an alignment consistent with an axis of the below ground source of the dipole magnetic field.

8. A method for tracking a below ground source of a magnetic field, the method comprising:

simultaneously detecting in three dimensions the magnetic field from a source at each of at least two distinct points of a receiver frame;
determining a location of the source relative to the receiver frame using the detected field values;
placing the receiver assembly on the ground in a proximity of a drill bit;
aligning the receiver with a desired bore path;
advancing the drill bit forward without rotation to perform a steering correction in the horizontal plane;
transmitting an orientation of the drill bit relative to the receiver from the receiver to an operator; and
transmitting a distance of forward advance of the drill bit without rotation from the receiver to the operator.

9. The method of claim 8 wherein the step of transmitting an orientation or transmitting a distance comprises:
alternately turning a transmitter on and off to communicate data in binary form;
detecting a signal condition when the transmitter is on and a no signal condition when the transmitter is off; and
decoding data communicated from a series of signal conditions and no signal conditions.

* * * * *